United States Patent [19]
Kanai et al.

[11] Patent Number: 5,428,593
[45] Date of Patent: Jun. 27, 1995

[54] DIGITAL AUDIO SIGNAL TRANSFORMING METHOD AND APPARATUS

[75] Inventors: Chiaki Kanai; Naokazu Miyamoto, both of Kanagawa, Japan

[73] Assignee: Sony Corporation, Japan

[21] Appl. No.: 153,812

[22] Filed: Nov. 16, 1993

[30] Foreign Application Priority Data

Nov. 18, 1992 [JP] Japan .................. 4-309098

[51] Int. Cl.⁶ ............................. H04N 5/76
[52] U.S. Cl. .................................. 369/059
[58] Field of Search .......... 360/65, 59, 15, 51, 360/32; 369/32, 57, 85, 86, 59

[56] References Cited

U.S. PATENT DOCUMENTS

| | | | |
|---|---|---|---|
| 4,937,807 | 6/1990 | Weitz et al. | 369/85 |
| 5,105,314 | 4/1992 | Ro | 369/85 X |
| 5,179,543 | 1/1993 | Nara et al. | 369/85 X |
| 5,191,573 | 3/1993 | Hair | 369/85 X |
| 5,195,075 | 3/1993 | Shiba et al. | 369/86 X |
| 5,267,094 | 11/1993 | Aoki | 360/15 X |

FOREIGN PATENT DOCUMENTS

0312405A3 4/1989 European Pat. Off. .
0480682A3 4/1992 European Pat. Off. .

OTHER PUBLICATIONS

Patent Abstracts of Japan, vol. 13, No. 19 (P-814), 18 Jan. 1989 & JP-63 222 382 (Matsushita Electric Ind. Co. Ltd.), 16 Sep. 1988.
Patent Abstracts of Japan, vol. 9, No. 129 (P-361), 5 Jun. 1985 & JP-A-60 013 361 (Mitsubishi Denki KK), 23 Jan. 1985.
Patent Abstracts of Japan, vol. 10, No. 22 (P-424), 28 Jan. 1986 & JP-A-60 175 255 (Sharp KK), 9 Sep. 1985.

Primary Examiner—Donald Hajec
Assistant Examiner—Thien Minh Le
Attorney, Agent, or Firm—Limbach & Limbach; Alan S. Hodes

[57] ABSTRACT

A transforming apparatus for compressing digital audio signals of a first format for transformation into second digital audio signals of a different format or a second format. The transforming apparatus includes a peak level calculating circuit for calculating the audio level of the digital audio signals of the first format, a hard disc unit for recording and reproducing level data of the digital audio signals of the first format along with the second digital audio signals to which data exclusively used for the second format are appended and a level indicator for displaying the audio level of the digital audio signals of the first format prior to transformation for monitoring the level of the pre-compression digital audio signals.

10 Claims, 2 Drawing Sheets

DIGITAL AUDIO SIGNAL TRANSFORMING METHOD AND APPARATUS

BACKGROUND OF THE INVENTION

1. Field of the Invention

This invention relates to a method and apparatus for compressing digital audio signals of a first format, such as those of a compact disc format, and transforming the compressed signals into second digital audio signals of a different format.

2. Description of the Related Art

The optical disc may be increased in recording capacity by two to three orders of magnitude larger than the magnetic disc so that it permits high-speed accessing as compared to the tape-shaped recording medium. Besides, the optical disc renders it possible to record and/or reproduce information signals without contacting the optical pickup unit as the recording and/or reproducing apparatus with the disc and hence is superior in durability.

As such optical disc, a so-called compact disc, referred to hereinafter as CD, is currently in extensive use.

To provide a portable and, above all, a pocket size headphone stereo or similar recording/reproducing apparatus using an optical disc, a CD with a diameter of 12 cm and a CD with a diameter of 8 cm have been proposed. However, with a disc diameter of 12 cm, the recording/reproducing apparatus become too bulky in size to be readily portable. For further reducing the size of the recording/reproducing apparatus, it may be contemplated to employ a disc which is 8 cm or less in diameter. However, in attempting to construct a portable or pocket size recording/reproducing apparatus for an optical disc which is 8 cm or less in diameter, the following problems arise.

In the case of a standard CD format optical disc, on which are recorded stereophonic digital PCM audio signals with a sampling frequency of 44.1 kHz and quantized with 16 bits, and where these signals are exclusively reproduced by the user, the playback time (recording time) is 20 to 22 minutes at most, such that a symphony, for example, cannot be recorded on one disc side. A playback time of 74 minutes or longer, which is approximately equal to that of a 12 cm CD, is desired. Besides, with this CD-DA format, recording by the user is not feasible. In addition, a contact-less type optical pick-up device is vulnerable to mechanical vibrations and subject to detracking or defocusing. Thus, when the apparatus is to be portable, some positive means must be provided to prevent any adverse effects of detracking or defocusing on signal reproduction.

On the other hand, with a CD-MO format (a format employing a recordable magneto-optical disc) as an extension format of the above-mentioned standard CD format (CD-DA format), the recording/reproducing time of an 8 cm disc is only 20 to 22 minutes, as in the CD-DA format. The optical pick-up device is similarly subject to detracking or defocusing due to mechanical vibrations, such that again some positive means must be taken to prevent any adverse effects thereof on signal recording/reproduction.

With the CD-I (CD-Interactive) format, signals obtained by 4-fold compression of standard CD-DA format signals are reproduced. Thus, if all of the recorded data are stereophonic audio compressed data, playback time increases 4-fold, or reproduction of 4-channel data, becomes feasible, so that reproduction for 70 minutes or longer becomes possible with an optical disc which is 8 cm in diameter. However, when continuous signals are to be recorded with the CD-I format, several track jumps over a considerable distance spanning the inner and outer disc peripheries need to be carried out. Since the track jump cannot be achieved instantaneously, playback data are interrupted for the time being, that is, the playback sound is interrupted momentarily. Besides, if continuous audio signals are to be recorded, it becomes necessary to re-write previously recorded sector signals, because the signals are interleaved during recording. Thus it becomes extremely difficult to record continuous compressed signals.

In view of the foregoing, the present Assignee has proposed in JP Patent KOKAI Publication No.4-105271 (1992), a disc recording apparatus and a disc play-back apparatus for overcoming the above-depicted problems. That is, an arrangement is disclosed in which 16-bit digital audio signals are compressed to one-fourth of one-fifth to enable recording and/or reproduction of music signals of 72 to 76 minutes on or from a magneto-optical disc having a disc diameter of 64 mm.

Meanwhile, with an audio compression technique for producing compressed digital audio signals recorded and reproduced on or from the magneto-optical disc which is 64 mm in diameter, that is the adaptive transform acoustic coding (ATRAC), analog signals are translated into digital signals of a bit rate of 1.4 Mbps which is the same as that for the DC format. Subsequently, the digital signals are processed with frequency analysis of transforming the time domain signals into approximately 1,000 frequency components by the Fourier transform, with data of approximately 20 ms at the maximum as one block. During the frequency analysis, extraction of the frequency components on the frequency domain is performed, beginning from those components which are most critical to the aural sense, using the so-called minimum audibility characteristics or masking effects, based on the knowledge of the aural psychology, until the amount of information becomes equal to 300 kbps.

Meanwhile, the disc recording and/or playback apparatus for recording/reproducing compressed digital audio signals on or from the magneto-optical disc which is 64 mm in diameter have already been manufactured and put on sale. The discs in an unrecorded state for recording by the user, or the pre-recorded disc having the music, for example, recorded thereon, are available on the market.

For producing the pre-recorded discs, such as music discs, it may be contemplated to produce newly a compressed format master tape for compressed digital audio signals to record the digital audio signals from such master tape to the disc, by way of mastering. However, it is more desirable from the viewpoint of saving the labor of re-recording of the music or reducing the costs to utilize the pre-recorded master tapes for production of CDs, which are available in large quantities.

Consequently, it becomes necessary to produce a new master tape in which the CD format digital audio data from the preexisting master tapes for CD production is transformed in accordance with a compression format for compressed digital audio signals.

It is noted that, when producing a master tape, the audio level to be recorded has to be set to an optimum or desirable audio level. The sound level value is of particular importance for professional systems. Consequently, when producing a master tape of the compression format for the compressed digital audio signals, it is necessary to calculate and display the audio level values and to adjust the displayed audio level.

However, the signal level of the original pre-compression signals cannot be monitored correctly by simply transforming the CD format digital audio signals into data of a compression format for compressed digital audio signals, recording the transformed data on a master tape, reproducing the compressed digital audio signals with decompression or expansion, calculating and displaying the produced signal level. That is, since the original pre-compression signals are changed in signal level by compression, the signal level after compression and subsequent expansion cannot be said to correctly represent the level of the original signal. In other words, if the digital audio signals are compressed, the ratio of the signal level before compression to that after compression is not necessarily equal to 1.

Bedsides, if the compressed digital audio signals are decompressed or expanded and the level value is computed based on such signals, it becomes necessary to carry out the level value computation and the signal processing for display at an increased speed compatible with the compression ratio.

OBJECT AND SUMMARY OF THE INVENTION

In view of the above-described status of the art, it is a principal object of the present invention to provide a transforming apparatus whereby the original sound level can be monitored correctly and the signal processing speed for level computation and display can be increased in association with the compression ratio.

According to the present invention, there is provided a transforming apparatus for digital audio signals comprising reproducing means including a digital master recorder and a digital audio processor for reproducing digital audio signals of a first format from a recording medium on which the digital audio signal of the first format are recorded, format transforming means for transforming the digital audio signals of the first format into digital audio data of a second format and appending data exclusively used for the second format, and the digital master recorder for recording an output of the format transforming means on a recording medium, wherein the format transforming means has recording-/reproducing means for separating the audio level of the digital audio signals of the first format for recording and reproduction and level indicating means for indicating the audio level.

The recording/reproducing means of the format transforming means is random accessible. The random accessible recording/reproducing means includes, for example, a hard disc.

The data appended by the format transforming means for use exclusively for the second format may be entered by a keyboard.

The transforming means of the transforming apparatus for digital audio signals according to the present invention separates and stores the audio level data of the digital audio signals of the first format at the same time as the transforming means transforms the digital audio signals of the first format into the digital audio signals of the second format. Consequently, the signal level of the digital audio signals of the first format prior to transformation may be known by displaying the audio level data.

Other objects and advantages of the present invention will become clear from the following description of the preferred embodiment and the claims.

DETAILED DESCRIPTION OF THE PREFERRED EMBODIMENT

Figure 1:
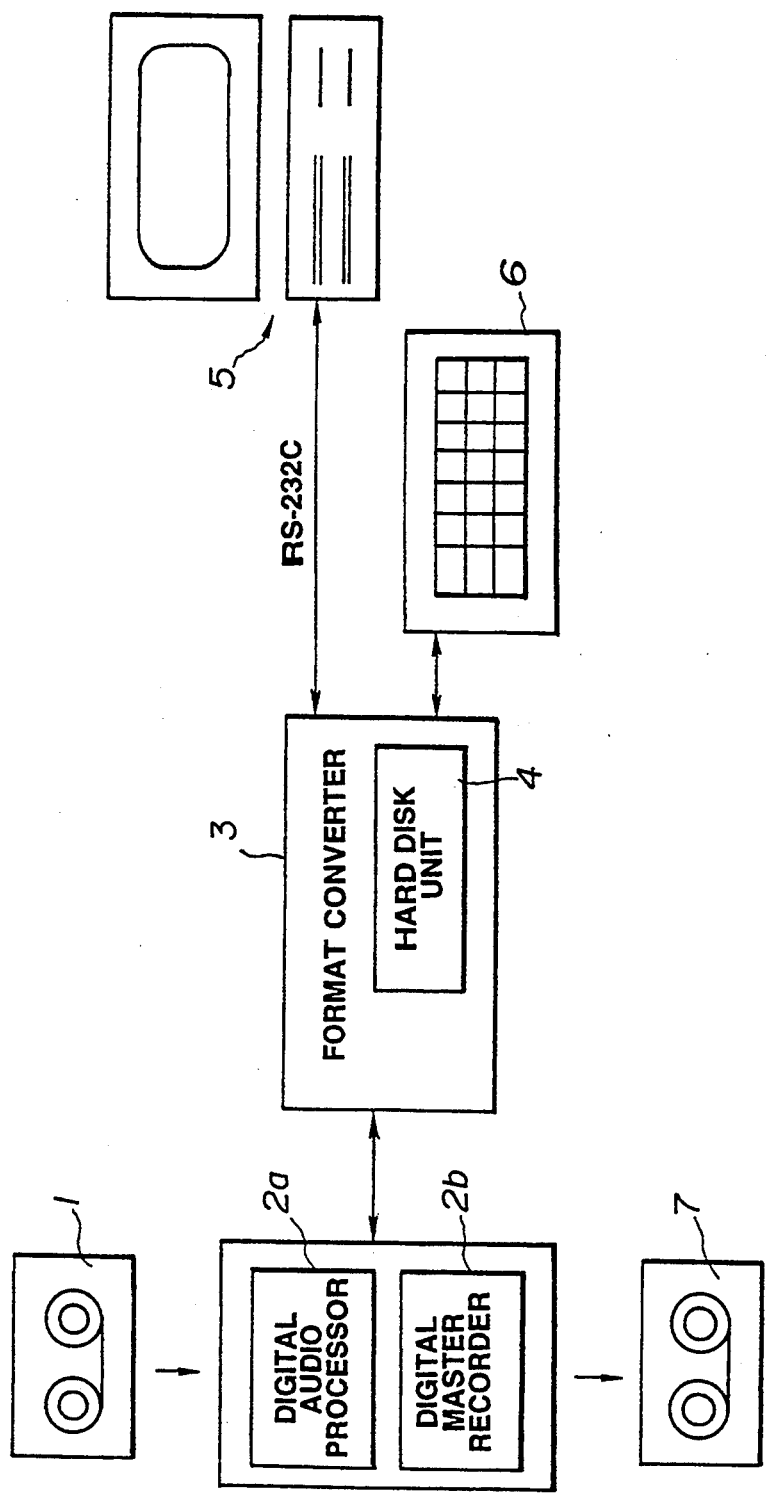
FIG. 1 is an overall schematic block diagram showing a transforming device for digital audio signals according to the present invention.

Referring to the drawings, a preferred embodiment of the transforming device for digital audio signals according to the present invention is explained in detail.

The transforming device for digital audio signals shown in FIG. 1 comprises a digital audio processor 2a and a digital master recorder 2b as reproducing means for reproducing CD format digital audio signals from a CD master tape, that is a recording medium on which digital audio signals of, for example, a CD format as a first format, are pre-recorded, a format converter 3 as format transforming means for transforming the CD format digital audio signals from the digital audio processor 2a into the above-mentioned compression format as a second format and appending data exclusively used for the compression format to the transformed data, and the above-mentioned digital master recorder 2b as the recording means for recording an output of the format converter 3 on a master tape 7 for the compression format. The format converter 3 comprises a recording-/reproducing unit for separating audio levels of the CD format digital audio signals and recording/reproducing at least the separated audio levels (audio level data) and a level display unit for displaying the audio levels, as explained subsequently.

The format converter 3 includes a hard disc unit 4, as the above-described recording/reproducing unit capable of random accessing.

Among data which are exclusively employed for the compression format and which are appended by the format converter 3, there are article item code (category code) information, title (air or number indication) information or letter information, all of which may be entered by a keyboard 6.

Referring to FIG. 1, the CD master tape 1 is a ¾ inch digital audio cassette tape on which 16-bit digital audio signals are recorded. The CD master tape 1 is played back by the digital master recorder 2b and the digital audio processor 2a. The playback signals are checked for errors by a tape analyzer, not shown. The 16-bit digital audio signals are transmitted to the format converter 3.

The sub-code information or table-of-contents (TOC) information, recorded on an analog track of the CD master tape 1, is similarly reproduced and transmitted to the format converter 3.

In the format converter 3, the 16-bit digital audio signals as well as the sub-code information are compressed into compression format data. The compressed digital audio signals are recorded on a hard disc, nor shown, enclosed within the hard disc unit 4.

The ancillary data exclusively used for the compression format, such as the title information, is supplied from the accessory keyboard 6 or from an external computer 5 to the format converter 3 via a line RS-232C so as to be recorded on the hard disc in the hard disc unit 4.

Meanwhile, the compressed signals are also restored into the 16-bit digital audio signals for monitoring on the real-time basis.

In the present embodiment, level data of the CD format digital audio signals are also generated during format transformation by the format converter 3 and recorded on the hard disc in the hard disc unit 4 along with the compression format digital audio signals. That is, in the present embodiment, the level value data of the audio signals prior to compression for recording on the hard disc are left as the information so that the level value data of the pre-compression audio signals may be utilized for level indication when the compression format digital audio signals are decompressed for monitoring subsequently.

Figure 2:
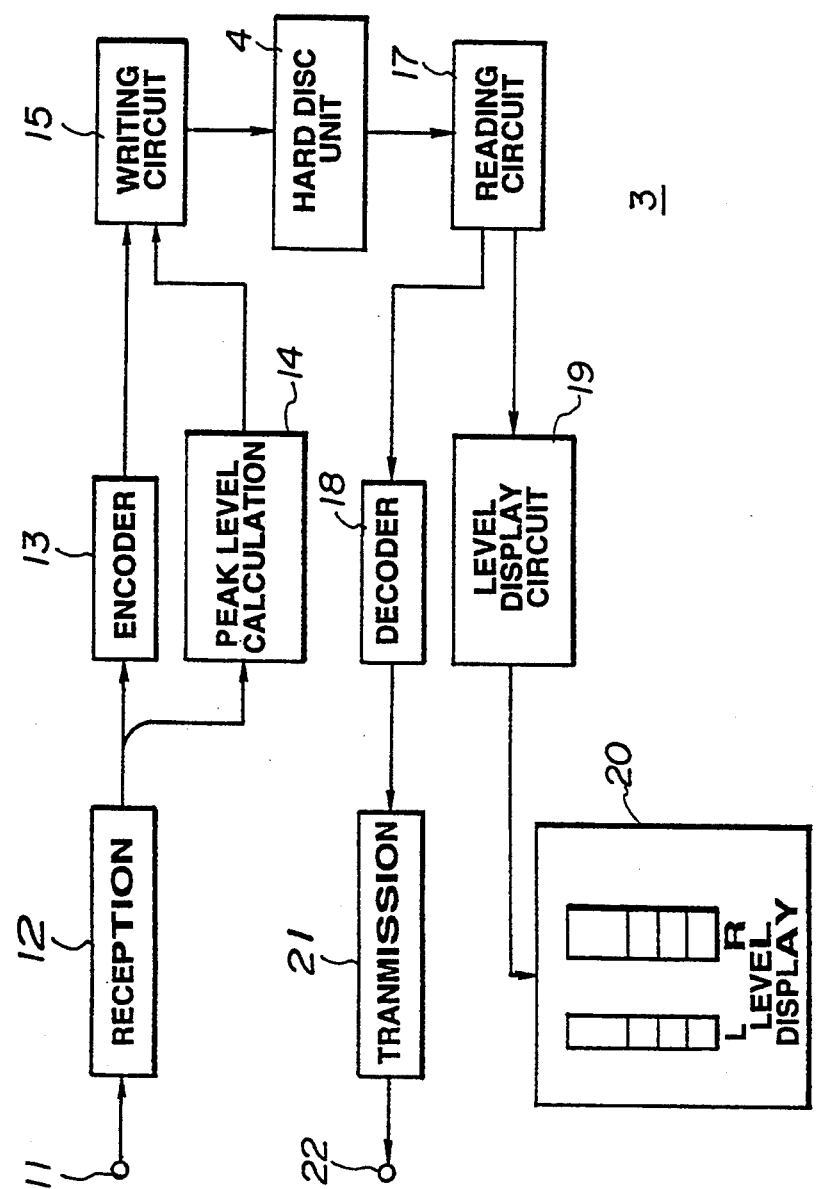
FIG. 2 is a block circuit diagram showing a concrete arrangement of a format converter according to the present invention.

FIG. 2 shows a concrete arrangement of the format converter 3 which renders it possible to generate the pre-compression level data, recording/reproduction of the level data on or from the hard disc and level display by the level data. Meanwhile, the arrangement of FIG. 2 is adapted for monitoring the sound subsequent to compression and expansion and for displaying the pre-compression signals.

Referring to FIG. 2, the format converter 3 comprises a peak level calculating circuit 14, as an audio level calculating section for finding the audio level of the CD format digital audio signals from the digital audio processor 2a, the above-mentioned hard disc unit 4 as a random-access recording/reproducing unit for recording/reproducing the audio level information as found by the peak level calculating circuit 14 along with the digital audio signals having appended thereto the above-mentioned data exclusively employed for the compression format, and a level indicator 20 for indicating the audio levels.

Referring to FIG. 2, the CD format digital audio signals from the digital audio processor 2a are supplied to an input terminal 11 and thence supplied via a receiving circuit 12 to an encoder 13 and the peak level calculating circuit 14. In the encoder 13, the CD format digital audio signals are transformed into the compression format digital audio signals. An output of the encoder 13 is transmitted to a writing circuit 15 which generates write signals for writing on the hard disc in the hard disc unit 4.

In the peak level calculating circuit 14, a peak level or a mean value of the CD format digital audio signals is found. An output of the peak level calculating circuit 14 is also supplied to the writing circuit 15.

The writing circuit 15 may be implemented by a circuit for generating write addresses which may be employed for recording the compression format digital audio signals and the output of the peak level calculating circuit 14 in pre-set recording areas of the hard disc of the hard disc unit 4 based on pre-set timing signals supplied from an internal computer, not shown. That is, the recording area for the compression format digital audio signals and the recording area for the level data are previously set in the hard disc and the writing circuit 15 generates the write addresses of recording the compression format digital audio signals from the encoder 13 in the digital audio signal recording area and recording the level data from the peak level calculating circuit 14 in the level data recording area, while causing the digital audio signals and the level data to be recorded on the hard disc responsive to these Write addresses.

Although the above-mentioned pre-set timings may be optionally set, an interval corresponding to every 512 samples of the CD format digital audio signals may be adopted as such timing. Meanwhile, the 512 samples also represent a unit of data compression of the compression format.

From the hard disc of the hard disc unit 4, on which the data are recorded in this manner, the compression format digital audio signals and the level data are read out by a reading circuit 17. Meanwhile, the reading circuit 17 may be implemented by a circuit for generating readout addresses for reading out the information stored in the hard disc unit 4 on the basis of timing signals having the above-mentioned pre-set timings. That is, the reading circuit 17 generates readout addresses of reading out the compression format digital audio signals from the digital audio signal recording area of the hard disc and of reading out the level data from the level data recording area of the hard disc. In this manner, the compression format digital audio signals and the level data are read out separately from the hard disc unit 4.

The compression format digital audio data, read out from the hard disc as described above, is transmitted to a decoder 18, where the separated digital audio signals and level data signals separated from each other are combined together with time domain matching to form continuous compression format digital audio signals. The continuous compression format digital audio signals are outputted at an output terminal 22 via a transmission circuit 21 as audio signals for monitoring purposes.

The level data read from the hard disc is transmitted to a level indicating circuit 19. The level indicating circuit 19 forms level signals to be displayed in the level indicator 20 from the level data and performs filtering which will give an appropriate level indication at the level indicator 20 in the form of deviation of a level meter needle. In this manner, level display may be made on the level indicator 20. That is, the level displayed on the level indicator 20 represents the level of the CD format digital audio signals prior to compression.

According to the present invention, as describe above, the level value data of the CD format digital audio signals are calculated and recorded in separate recording areas of the hard disc, at the same time as the 16-bit CD format digital audio data are compressed into the compression format digital audio signals for recording on the hard disc, and the level data thus recorded are read out for display on the level indicator 20, so that the level data of the pre-compression audio signal level values may be known using the level data stored in the separate recording area, by way of correctly monitoring the original sound level.

Besides, according to the present invention, if the compressed data is to be duplicated directly and the level display is to be made simultaneously, the signal processing speed for calculation and display of the level values may be increased as compared to the compression ratio.

The level data and the compression format digital audio signals, which are recorded on the hard disc of the format converter 3 and to which are appended the data exclusively employed for the compression format, are read out from the hard disc and transmitted to the digital master recorder 2b where the data are duplicated on a ¾ inch digital audio cassette tape, not shown, similar to the CD master tape 1. This completes a compression format pre-mastering tape or master tape 7. That is, the level data of the pre-compression CD format digital audio data are left on the master tape 7.

Error checking may be performed at this time by the tape analyzer to output an error check sheet and ultimately the title etc. of the sub-converter data is printed so as to be supplied along with the error check sheet, to a tape duplicating plant with the pre-mastering tape for confirmation purposes.

The digital audio signals from the master tape 7 of the compression format are recorded on an optical disc 64 mm in diameter in the duplicating plant in the manner of maintaining the recording time which is as long as that for the compact disc.

It is sen from above that, with the present embodiment of the mastering system and the pre-mastering system for the compression format digital audio signals, current system equipment for the compact discs may be employed without any modification, while the ¾ inch digital audio cassette tape, which is the same as the CD mastering tape 1, may also be employed without any modifications.

It should be noted that, in the present embodiment, a digital audio processor manufactured by the SONY CORPORATION under the trade name of PCM-1630 and a digital master recorder manufactured by the SONY CORPORATION under the trade name of DMR-4000 are employed as the digital audio processor 2a and as the digital master recorder 2b, respectively. Besides, a format converter manufactured by the SONY CORPORATION under the trade name of K1216 and a tape analyzer manufactured by the SONY CORPORATION under the trade name of DTA-2000 are employed as the format converter 3 and as the tape analyzer, respectively.

What is claimed is:

1. A transforming apparatus comprising reproducing means for reproducing digital audio signals of a first format from a recording medium on which said digital audio signal of the first format are recorded, format transforming means for transforming the digital audio signals of the first format into digital audio data of a second format and appending data exclusively used for said second format to the resulting second format data, and recording means for recording an output of said format transforming means on a recording medium, wherein
    said format transforming means has recording/reproducing means for separating the audio level of said digital audio signals of the first format for recording and reproduction and level indicating means for indicating the audio level.

2. The transforming apparatus as claimed in claim 1 wherein said recording/reproducing means of said format transforming means is random accessible.

3. The transforming apparatus as claimed in claim 2 wherein said random accessible recording/reproducing means of said format transforming means comprises a hard disc.

4. A transforming apparatus comprising reproducing means for reproducing digital audio signals of a first format from a recording medium on which said digital audio signal of the first format are recorded, format transforming means for transforming the digital audio signals of the first format into digital audio data of a second format and appending data exclusively used for said second format to the resulting second format data, and recording means for recording an output of said format transforming means on a recording medium, wherein
    said format transforming means has recording/reproducing means for separating the audio level of said digital audio signals of the first format for recording and reproduction and lat indicating means for indicating the audio level,
    said recording/reproducing means of said format transforming means is random accessible, and
    said data appended by said format transforming means and exclusively used for said second format are entered by a keyboard.

5. A method for transforming digital audio signals comprising the steps of
    a) reproducing digital audio signals of a first format from a recording medium on which said digital audio signals of the first format are recorded,
    b) transforming the reproduced digital audio signals of the first format into digital audio signals of a second format,
    c) appending data peculiar to the second format to the transformed digital audio data of the second format, and
    d) recording the digital audio signals having said peculiar data appended thereto on the recording medium, wherein said transforming step has steps of
    e) separating the audio level of the digital audio signals of said first format,
    f) recording and reproducing the separated audio level, and
    g) displaying the reproduced audio level.

6. The transforming method as claimed in claim 5 wherein the peculiar data appended to the transformed digital audio signals of the second format are entered by a keyboard.

7. A transforming apparatus comprising:
    a. a reproducing apparatus for reproducing audio signals having a first format from a recording medium on which said digital audio signals having the first format are recorded;
    b. format transforming means for transforming the first format digital audio signals into digital audio signals having a second format, the second format digital audio signals having a different audio level than the first format digital audio signals, the format transforming means including:
        i. receiving and extracting means for receiving the first format digital audio signal and for extracting audio level information from the first format digital audio signal;
        ii. encoding means connected to the receiving and extracting means for transforming the first format digital audio signal into the second format digital audio signal; and
        iii. audio level calculating means also connected to the receiving and extracting means for calculating the audio level of the first format digital audio signal from the extracted audio level information; and
    c. storage means connected to the encoding means and the audio level calculating means for storing the second format digital signal and the calculated audio levels of the first format digital audio signal.

8. The transforming apparatus of claim 7, further comprising:

d. decoding and transmission means connected to receive the second format digital signal from the storage means for decoding the second format digital signal and providing the decoded second format digital signal to an output terminal; and e. level indicating means connected to receive the calculated audio levels of the first format digital audio signal for indicating the calculated audio levels of the first format digital signal.

9. A method of transforming a digital audio signal having a first format into a digital audio signal having a second format, the method comprising steps of:

a. reproducing the digital audio signals having the first format from a recording medium on which said first format digital audio signals are recorded;

b. extracting audio level information from the first format digital audio signal;

c. encoding the first format digital audio signal into the second format digital audio signal; and d. calculating the audio level of the first format digital audio signal from the extracted audio level information; and e. storing the second format digital signal and the calculated audio levels of the first format digital audio signal on a storage means.

10. The method of claim 9, further comprising:

f. reading the second format digital signal from the storage means;

g. decoding the second format digital signal and providing the decoded second format digital signal to an output terminal; and h. reading the calculated audio levels of the first format digital audio signals from the storage means and indicating the calculated audio levels of the first format digital signal.

* * * * *